(12) United States Patent
Antonopoulos et al.

(10) Patent No.: US 11,005,140 B2
(45) Date of Patent: May 11, 2021

(54) LITHIUM CELL HAVING A GLASSY CARBON LAYER

(71) Applicant: Bayerische Motoren Werke Aktiengesellschaft, Munich (DE)

(72) Inventors: Byron Konstantinos Antonopoulos, Munich (DE); Barbara Stiaszny, Obergriesbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 16/440,341

(22) Filed: Jun. 13, 2019

(65) Prior Publication Data

US 2019/0296308 A1 Sep. 26, 2019

Related U.S. Application Data

(63) Continuation of application No. PCT/EP2017/080646, filed on Nov. 28, 2017.

(30) Foreign Application Priority Data

Dec. 16, 2016 (DE) ..................... 10 2016 225 313.1

(51) Int. Cl.
| | | |
|---|---|---|
| *H01M 2/16* | (2006.01) | |
| *H01M 50/449* | (2021.01) | |
| *H01M 4/38* | (2006.01) | |
| *H01M 4/40* | (2006.01) | |
| *H01M 10/052* | (2010.01) | |
| *H01M 4/136* | (2010.01) | |
| *H01M 12/08* | (2006.01) | |
| *H01M 4/58* | (2010.01) | |
| *H01M 10/0562* | (2010.01) | |
| *H01M 10/0565* | (2010.01) | |
| *H01M 10/42* | (2006.01) | |
| *H01M 50/46* | (2021.01) | |
| *H01M 50/411* | (2021.01) | |
| *H01M 50/431* | (2021.01) | |

(52) U.S. Cl.
CPC ......... *H01M 50/449* (2021.01); *H01M 4/136* (2013.01); *H01M 4/38* (2013.01); *H01M 4/382* (2013.01); *H01M 4/405* (2013.01); *H01M 4/5815* (2013.01); *H01M 10/052* (2013.01); *H01M 10/0562* (2013.01); *H01M 10/0565* (2013.01); *H01M 10/4235* (2013.01); *H01M 12/08* (2013.01); *H01M 50/411* (2021.01); *H01M 50/431* (2021.01); *H01M 50/46* (2021.01); *Y02E 60/10* (2013.01)

(58) Field of Classification Search
CPC ............. H01M 2/1686; H01M 2/1646; H01M 2/1653; H01M 2/1666; H01M 2/1673; H01M 4/136; H01M 4/38; H01M 4/382; H01M 4/405; H01M 4/5815; H01M 10/052; H01M 10/0562; H01M 10/0565; H01M 10/4235; H01M 12/08

See application file for complete search history.

(56) References Cited

U.S. PATENT DOCUMENTS

| | | |
|---|---|---|
| 3,854,979 A | 12/1974 | Rossi |
| 4,816,338 A | 3/1989 | Terasaki et al. |
| 2003/0129497 A1 | 7/2003 | Yamamoto et al. |
| 2008/0057401 A1 | 3/2008 | Mori et al. |
| 2009/0087751 A1 | 4/2009 | Kondo et al. |
| 2013/0266842 A1 | 10/2013 | Woehrle et al. |
| 2013/0309572 A1 | 11/2013 | Zhang et al. |
| 2014/0099538 A1 | 4/2014 | Johnson et al. |
| 2014/0147710 A1 | 5/2014 | Schaefer |
| 2015/0056387 A1 | 2/2015 | Dadheech et al. |
| 2015/0084604 A1 | 3/2015 | Thillaiyan et al. |
| 2016/0156065 A1* | 6/2016 | Visco ................. C03C 4/18 429/322 |

FOREIGN PATENT DOCUMENTS

| | | |
|---|---|---|
| DE | 10 2012 023 294 A1 | 5/2014 |
| WO | WO 2011/090235 A1 | 7/2011 |
| WO | WO 2011/157489 A1 | 12/2011 |

OTHER PUBLICATIONS

International Search Report (PCT/ISA/210) issued in PCT Application No. PCT/EP2017/080646 dated Jan. 4, 2018 with English translation (six (6) pages).
German-language Written Opinion (PCT/ISA/237) issued in PCT Application No. PCT/EP2017/080646 dated Jan. 4, 2018 (five (5) pages).
German-language Search Report issued in counterpart German Application No. 10 2016 225 313.1 dated Aug. 8, 2017 with partial English translation (11 pages).
Cover Page of EP 2 583 331 A1 published Apr. 24, 2013 (one (1) page).
Knauth, P., "Inorganic solid Li ion conductors: An overview", Solid State Ionics 180, 2009, pp. 911-916 (six (6) pages).

* cited by examiner

*Primary Examiner* — Jane J Rhee
(74) *Attorney, Agent, or Firm* — Crowell & Moring LLP

(57) ABSTRACT

A separator for a lithium secondary cell is provided. The separator has a separator substrate, selected from porous separators for liquid-electrolyte cells and solid-electrolyte separators having lithium ion conductivity, and has a layer of glassy carbon (GC), which is applied at least on one side of the separator substrate. A lithium secondary cell is also provided, which contains a negative electrode, a positive electrode, and a separator placed between the negative electrode and the positive electrode. The glassy carbon layer of the separator faces the negative electrode.

13 Claims, No Drawings

LITHIUM CELL HAVING A GLASSY CARBON LAYER

CROSS REFERENCE TO RELATED APPLICATIONS

This application is a continuation of PCT International Application No. PCT/EP2017/080646, filed Nov. 28, 2017, which claims priority under 35 U.S.C. § 119 from German Patent Application No. 10 2016 225 313.1, filed Dec. 16, 2016, the entire disclosures of which are herein expressly incorporated by reference.

BACKGROUND AND SUMMARY OF THE INVENTION

The invention relates to a lithium cell which has a glassy carbon layer between a negative electrode and a separator. The cell may employ a liquid electrolyte or a solid-state electrolyte or may be a lithium-sulfur or lithium-atmospheric oxygen cell. In particular, the cell may employ metallic lithium or lithium alloys as the active material of the negative electrode and the glassy carbon layer may be applied atop the separator.

Presently, the lithium ion batteries contain a liquid electrolyte, typically employed with essentially a negative electrode (anode), a positive electrode (cathode) and a separator disposed therebetween saturated with a nonaqueous liquid electrolyte. The anode and the cathode include an anode active material and a cathode active material, respectively, which is applied atop a current collector optionally using a binder and/or an additive to improve electrical conductivity. Typically, employed as anode active materials are carbon-based materials, such as graphite, which are capable of intercalating and deintercalating lithium ions with simultaneous reduction and oxidation.

In lieu of such intercalation materials, the use of metallic lithium or lithium alloys as the anode active material would be desirable for increasing energy density. However, metallic lithium and lithium alloys have a tendency for forming dendrites during deposition, for example due to minimal inhomogeneities of the surface or of the electrical field. In the worst case, these can grow through the separator and thus result in internal short circuits with the counter electrode. In the case of liquid electrolytes, the electrolyte solvent can moreover be reduced at the reactive lithium surface newly formed by the dendrite growth, thus resulting in premature loss of capacity. As a result, metallic lithium is presently employed essentially in primary cells having a liquid electrolyte which do not require recharging, thus rendering the deposition morphology of lithium irrelevant.

As an alternative to cells having a liquid electrolyte, all-solid-state cells are of increasing interest. All-solid-state cells employ ceramic or glassy solid-state electrolytes or polymer electrolytes instead of liquid electrolytes and thus do not suffer from the problems of solvent decomposition. Dendrite deposition is also generally inhibited in all-solid-state cells. The use of metallic lithium for all-solid-state cells is therefore contemplated. However, there remains a need for improving deposition morphology to further reduce susceptibility to degradation with increasing cycle count.

To further increase energy density efforts are currently underway to employ on the side of the positive electrode conversion materials, such as iron and copper fluoride or CuS, sulfur or atmospheric oxygen instead of the transition metal oxide-based intercalation-active materials customary today. Ideally, metallic lithium is used as the anode active material here to maximize energy density. Such a lithium/sulfur or lithium/oxygen cell can in turn be conceived as a cell comprising a liquid electrolyte or as an all-solid-state cell. The same problems in respect of dendrite deposition as elucidated hereinabove for the case of conventional cells are therefore also encountered when using lithium.

Having regard to the problems described above, there is a need for measures for improving/homogenizing lithium deposition morphology to inhibit dendrite formation in order to increase the cycle stability of all-solid-state cells employing metallic lithium and indeed to even allow the use of metallic lithium in secondary cells containing a liquid electrolyte.

In addition, even in conventional carbon-based anode active materials, whose potential is usually only slightly above the potential of lithium, deposition of metallic lithium in the form of dendrites cannot always be ruled out depending on the condition of the active material and the charging current. There is thus a need for measures for inhibiting dendrite growth even for cells using conventional anode active material.

The present invention has for its object to solve or at least ameliorate the problems recited hereinabove and to provide a lithium secondary cell in which the growth of dendrites is inhibited.

It is an object of the invention to provide a lithium secondary cell having a glassy carbon layer between a negative electrode and a separator.

It is another object of the invention to provide a separator for a lithium secondary cell which has a coating of glassy carbon on at least one side.

A lithium secondary cell of the present invention has the following parts: a negative electrode; a positive electrode; and a separator disposed therebetween which includes a layer of glassy carbon (GC) at least on the side facing the negative electrode.

The cell may be a liquid electrolyte cell or an all-solid-state cell. In the case of liquid electrolyte cells, the separator may be a porous polymer film, a nonwoven fabric or a porous ceramic separator. In the case of all-solid-state cells, a solid-state electrolyte layer functions as the separator. The cell may also be a lithium-sulfur or lithium-atmospheric oxygen battery.

In one embodiment, composite electrodes are provided in which the glassy carbon layer of the invention is incorporated as an integral constituent between the negative electrode and the separator.

The separator employed in the cell according to the invention is obtained by coating a separator substrate with glassy carbon (GC).

If a cell contains liquid electrolyte, the separator substrate may be a conventional porous separator which may be produced from a polymer film, a nonwoven fabric or of a ceramic material.

Separators based on polymer films are typically produced from a polymer material by melt extrusion in the so-called dry process or in the wet process. In the dry process, the pore structure is obtained as a result of the heat treatment and stretching of the film. In the wet process by contrast, the polymer material is admixed with a soluble wax which functions as a template and after production of the film is extracted with a solvent to form the pores. Typically employed as the polymer materials are, polyethylene or polypropylene or a combination thereof, though other materials such as polyvinylidene fluoride (PVdF) or copolymers thereof with hexafluoropropylene (PVdF-HFP), polyethylene oxide or polyacrylonitrile are also suitable.

Separators based on nonwoven fabric may be produced from very fine polymer fibers, for example from polyamides, polyimides or polyesters such as polyethylene terephthalate by processes known per se, for example as a spunbonded fabric.

Also suitable as an alternative to film or nonwoven fabric separators are ceramic composite separators. To this end, the surface of a film or nonwoven fabric separator may be coated with nanostructured ceramic material to improve mechanical properties and to increase the safety of the cell. Ceramic materials that may be employed include, for example oxides such as $SiO_2$, $Al_2O_3$, $Y_2O_3$, $TiO_2$, $ZrO_2$, $HfO_2$, $SnO_2$ and perovskite materials or combinations thereof.

Composite separators composed of a plurality of layers are another alternative. For example a film separator may include a polypropylene layer and a polyethylene layer. In the event of a temperature increase due to a fault (for example abnormally increased current flow due to short-circuit), the polyethylene layer melts first and seals the pores of the polypropylene layer, thus interrupting the current flow ("shutdown separator"). A nonwoven fabric separator or a ceramic composite separator for example, may also be combined with a film separator according to the same principle.

The thickness of the separator is typically 100 μm or less, preferably 10 to 60 μm, more preferably 15 to 30 μm. The pore diameter is typically 2 μm or less, preferably 1 μm or less, and the porosity is for example 20% to 70%, preferably 30% to 60%.

In the case of all-solid-state cells, a solid-state electrolyte layer having lithium-ion conductivity is employed as the separator substrate instead of the porous separator. Suitable solid-state electrolytes include glassy or ceramic inorganic lithium-ion conductors, polymer electrolytes or else composite materials having combinations of the materials described above.

An overview of suitable ceramic or glassy inorganic solid-state electrolytes may be found for example in P. Knauth, Solid State Ionics 180 (2009), 911-916 or J. W. Fergus, J. Power Sources 1995 (2010), 4554-4569 (chapter 2, "Ceramic Electrolytes"). Preferred examples are listed in EP 2 583 331 (A1) and includes the following compounds or a combination thereof:

Perovskite, in particular lithium-lanthanide-titanates (LLTO) such as

wherein 0<a≤0.16 and Ln represents a lanthanide or a mixture of lanthanides and □ represents a lattice vacancy;

Solid-state electrolytes of the NASICON (sodium Na Super Ionic Conductor) type, in particular having the formula

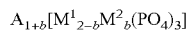

wherein A represents a monovalent element for example Li and/or Na, $M^1$ represents a tetravalent element such as Ge, Ti, Zr or a mixture thereof; $M^2$ represents a trivalent element such as Al, Cr, Ga, Fe, Sc, In, Lu, Y, La or a mixture thereof, and 0≤b≤1; for example $LiGe_2(PO_4)_3$ or $Li_{1.3}Al_{0.3}Ti_{1.7}(PO_4)_3$;

Solid-state electrolytes of the LISICON type (Lithium Super Ionic Conductor) or thio-LISICON type, in particular having the formula

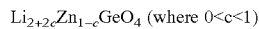

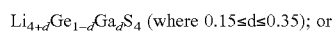

Solid-state electrolytes of the garnet type, in particular having the formula

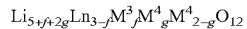

wherein 0≤f≤1 and 0≤g≤0.35; and Ln represents a lanthanide or a mixture of lanthanides, preferably selected from La, Pr, Nd, Sm and Eu; $M^3$ represents a divalent element or a mixture of divalent elements, preferably selected from Ba, Sr and Ca; $M^4$ represents a trivalent element or a mixture of trivalent elements, preferably In; $M^5$ represents a pentavalent element or a mixture of pentavalent elements, preferably selected from Ta, Nb or Sb.

Composite solid-state electrolytes composed of at least one lithium-ion-conductive compound such as LiI and $Li_2O$ and at least one mesoporous compound such as $Al_2O_3$ and $B_2O_3$; oxidic amorphous lithium-ion conductors such as $LiNbO_3$ or $LiTaO_3$ or oxidic glasses having lithium-ion conductivity; sulfidic lithium-ion conductors, in particular selected from the systems $Li_2S$—$P_2S_5$, $Ga_2S_3$ and/or $LaS_3$-doped $GeS_2$—$Li_2S$—LiI and also LiI and/or $Li_4SiO_4$-doped $Li_2S$—$SiS_2$, all in variable mixing ratios; lithium-ion conductors of the LiPON type (lithium phosphorus oxynitride) such as $Li_{2.88}PO_{3.73}N_{0.14}$ or $Li_{3.0}PO_{2.0}N_{1.2}$; lithium-ion conductors of the Li SON type (lithium sulfur oxynitride) such as $Li_{0.29}S_{0.28}O_{0.35}N_{0.09}$; lithium-ion conductors of the LiPOS type (lithium phosphorus oxysulfide) such as 6LiI—$4Li_3PO_4$—$P_2S_5$, lithium-ion conductors of the LiBSO type (lithium borate-sulfate) such as $(1-h)LiBO_2$-$hLi_2SO_4$ where 0<h<1 (for example h=0.7); or lithium-ion conductors of the LiSIPON type (lithium silicon phosphorus oxynitride) such as $Li_{2.9}Si_{0.45}PO_{1.6}N_{1.3}$.

Also employable as an alternative to an inorganic solid-state electrolyte is a polymer electrolyte. The polymer electrolyte includes a polymer material having lithium-ion conductivity such as polyethylene oxide (PEO), polymethyl methacrylate (PMMA), polyphenylene ether (PPO), phosphazene polymers such as MEEP or else polyacrylonitrile (PAN) or else fluorinated polymers such as PVdF or PVdF-HFP. To improve lithium-ion conductivity the polymer electrolytes typically contain a conductivity salt such as lithium perchlorate, lithium tetrafluoroborate, lithium hexafluorophosphate, $LiN(SO_2F)_2$ (LiFSI) or $LiN(SO_2CF_3)_2$ (LiTFSI). A preferred polymer electrolyte of this type is PEO in combination with $LiN(SO_2F)_2$ (LiFSI) or $LiN(SO_2CF_3)_2$ (LiTFSI).

Also suitable are polymer electrolytes having a nanostructured filler such as nanocrystalline boehmite ($AlO[OH]_n$). A preferred example is PVdF-HFP/$AlO[OH]_n$/$LiClO_4$.

The solid-state electrolyte layer may optionally contain one or more binders. If a composite material made of a ceramic solid-state electrolyte and a glassy or polymeric solid-state electrolyte is employed, the glassy or polymeric electrolyte may itself simultaneously also function as a binder for the ceramic electrolyte particles.

The solid-state electrolyte layer may be produced as a self-supporting layer which is then subsequently coated with glassy carbon and combined with the electrodes to form a stack or it may be directly applied atop the positive electrode. Suitable production/application processes include for example sintering, pressing, bleed coating or gas phase deposition processes. The layer thickness is typically 100 μm or less, preferably 50 μm or less, more preferably 30 μm or less.

The separator of the present invention has a glassy carbon (GC) coating at least on the side facing the negative electrode.

GC is generally produced by pyrolysis/carbonization of polymers. In the case of thermally stable separator substrates such as ceramic separators without polymeric binders or sintered solid-state electrolyte separators, the coating according to the invention may also be obtained by application of a polymer coating atop the composite material as a precursor, followed by pyrolysis. Suitable processes for producing GC coatings are described for example in U.S. Pat. Nos. 3,854,979 and 4,816,338.

U.S. Pat. No. 3,854,979 relates to the application of GC layers onto medical implants made of carbon or ceramic. The process disclosed therein includes heating and partially pyrolyzing a precursor polymer material selected from halogenated polymers such as PVC and natural organic materials such as petroleum pitch to obtain a pitch-like material having the approximate formula $C_nH_n$, mixing the pitch-like material with an aromatic solvent to obtain a slurry, coating the substrate with the slurry and baking the substrate. U.S. Pat. No. 4,816,338 describes a similar process specifically for coating graphite.

The carbonizable precursor polymers are not specifically limited according to the invention. Examples include thermosetting resins, for example based on aromatic compounds, for example phenolic resins such as phenol/formaldehyde resins, resins based on furfuryl alcohol or the like. Carbonizable vinylic or acrylic polymers such as polyacrylonitrile or polyvinyl chloride may also be used.

Carbonization may be carried out in a plurality of stages, for example, a first stage at about 500° C. to 800° C. to eliminate hydrogen, water or halogen, and a second stage at about 1000° C. to 1400° C. to effect further condensation of the typically largely aromatic hydrocarbon structures formed in the first stage. The temperature and the duration of the carbonization may be suitably chosen according to the type of the precursor polymer and the active material. The maximum temperature may in some cases be limited by the stability and the melting point of the ceramic separator. The carbonization may be performed under reduced pressure and/or an inert gas atmosphere.

Such a process may preferably be combined with the sintering of the ceramic solid-state electrode/separator material. To this end, the ceramic material is initially pressed, a layer of the precursor polymer is then applied and subsequently the pressed ceramic material having the applied layer is sintered while the precursor polymer is simultaneously carbonized.

Such a procedure is also suitable for positive electrodes for all-solid-state cells having a solid-state electrolyte layer applied directly thereupon. Here too, a precursor polymer layer may in turn be applied and the composite material stack composed of the electrode layer, solid-state electrolyte layer and precursor polymer is subsequently sintered/carbonized in one or more steps.

For application the polymer or in the case of thermosetting resins the monomers or low molecular weight polymers may be dissolved or dispersed in a suitable solvent. After application solvent is removed by drying, for example by heating and/or reduced pressure, to obtain the precursor polymer layer.

As an alternative to carbonization of the precursor polymer on the separator, it is possible to initially produce a GC film which is subsequently joined to the separator. Such a procedure is suitable in particular when the separator is unstable and can melt under the carbonization conditions as is generally the case for film or nonwoven fabric separators or for glassy solid-state electrolytes and polymer electrolytes.

Such a GC film may be obtained by application of a layer of the precursor polymer atop an inert substrate, carbonization, lamination with the separator and detachment of the separator having the GC layer. In the case of separators made of polymer materials, the lamination may optionally be carried out with heating in order to achieve light surface melting of the separator without, however, damaging the pore structure, thus increasing the adhesion of the GC layer. A binder such as PVdF may optionally also be employed to improve adhesion during lamination provided that this does not affect pore structure.

Detachment of the separator having the laminated GC layer from the substrate may be favored for example through the use of a very smooth substrate on which the GC layer shows only limited adhesion. The substrate may optionally also be provided with a soluble or complexable surface layer (for example an acid- or base-soluble oxide layer) which may be dissolved with a suitable solvent or complex-former to achieve detachment. Alternatively also employable as the substrate, is a metal foil which is removed in its entirety by complexing or etching after production of the separator.

It is also possible to use the anode material itself as the substrate, with first the GC layer and then the separator subsequently being applied thereupon. This makes it possible to produce a composite anode containing the GC layer and the separator as integral constituents. Detachment of the GC layer from the substrate is omitted in this case. Such a procedure is suitable in particular for nonporous, heat-resistant anodes such as are employed for example for all-solid-state cells.

Also, other alternatives for producing the GC layer are gas phase deposition processes where the process parameters must be suitably chosen to obtain a glassy deposition morphology.

The GC layer is substantially smooth and pore-free and has a high mechanical strength. Though the mechanism of inhibiting dendrite growth is not fully understood it is thought that the inhibition is achieved essentially by mechanical means by the growth path of the dendrites in the direction of the counter electrode being blocked. It is thought that the growth of dendrites is a phenomenon under kinetic control that is favored by inhomogeneities in the electrical field, i.e., the deposition of lithium proceeds preferentially at apexes and similar structures, thus leading to acicular, branching growth. The pressure exerted by the GC layer causes growth against the GC layer to become less favorable while surface mobility simultaneously increases so that dendrite growth is no longer energetically advantageous.

Even low layer thicknesses of the GC layer are sufficient to achieve effective inhibition of dendrite growth while by contrast high layer thicknesses can reduce permeability for lithium. The layer thickness of the GC coating is therefore preferably very thin, for example 5 μm or less, preferably 1 μm or less, in particular 10 to 500 nm, yet more preferably 50 to 250 nm.

The cells of the present invention may generally be produced by stacking or winding the negative electrode, the separator having the applied GC layer and the positive electrode. The construction of the electrodes is not specifically limited and known electrode types may be employed.

Electrodes for liquid electrolyte cells typically contain a porous layer of cathode-/anode-active material which is generally applied atop a current collector optionally using a binder such as PVdF and an additive for increasing electrical conductivity, for example carbon black. Typically employed current collectors are copper foil for the negative electrode and aluminum foil for the positive electrode.

Examples of suitable cathode-active materials are transition metal oxides having a layered structure of the type $LiMO_2$ (M=Co, Ni, Mn) such as $LiCoO_2$ (LCO), $LiNiO_2$, $LiMnO_2$ or mixed oxides such as $LiNi_xMn_yCo_zO_2$ (where x+y+z=1; NMC) or $LiCo_{0.85}Al_{0.15}O_2$ (NCA), spinels such as $LiMn_2O_4$ (LMO) or else phosphates crystallizing as olivine such as $LiFePO_4$ (LFP) or $LiFe_{0.15}Mn_{0.85}PO_4$ (LFMP). Other suitable cathode materials are conversion materials such as transition metal fluorides such as $FeF_3$, $NiF_2$, $CoFeF_3$, $CuF_2$, etc. or sulfides such as CuS. The use of a mixture of two or more of these materials is likewise suitable.

Employable anode active materials include for example carbon-based intercalation materials such as graphite, lithium titanate materials, alloy-formers such as silicon, aluminum or magnesium, or composite materials such as carbon/silicon. Since the GC layer inhibits dendrite growth the use of metallic lithium (for example in the form of a lithium foil or a foil made of lithium alloys for example LiAl having <5% Al or LiMg having <25% Mg) is also suitable.

Customary liquid electrolytes may be employed, for example based on carbonic esters such as ethylene carbonate (EC), propylene carbonate (PC), dimethyl carbonate (DMC), ethyl methyl carbonate (EMC), diethyl carbonate or mixtures thereof as solvent with a conductivity salt such as $LiPF_6$ dissolved therein.

In contrast to the electrodes for liquid electrolyte cells, electrodes for all-solid-state cells are largely pore-free. They typically contain a composite material made of an active material and a solid state electrolyte, optionally in combination with a conductivity additive and/or a binder, which is in turn applied atop a current collector. Suitable active materials/solid-state electrolytes in turn include the materials described above. Alternative materials employable as the negative electrode in turn also include lithium foil or a foil made of a lithium alloy and these are preferably applied atop a copper foil as the current collector.

All-solid-state cells are in principle obtainable analogously by stacking the negative electrode, the solid-state electrolyte layer having the GC coating and the positive electrode. Also employable as an alternative as described hereinabove are composite electrodes containing the solid-state electrolyte layer and the GC layer as integral constituents. The following constructions are possible, for example: positive composite electrode having integrated solid-state electrolyte layer and GC layer applied thereupon stacked with a simple negative solid-state electrode (i.e., without integrated layers); positive composite electrode having integrated solid-state electrolyte layer stacked with a negative electrode having integrated GC layer; simple positive solid-state electrode stacked with a negative composite electrode having an integrated GC layer and an integrated solid-state electrolyte layer applied thereupon; and simple positive solid-state electrode stacked with a solid-state electrolyte separator layer and a negative composite electrode having an integrated GC layer.

The separator having a GC layer of the present invention may additionally also be employed in lithium-sulfur cells and in lithium-air cells. Such cells which are presently in development may in principle likewise be in the form of liquid electrolyte cells or solid-state electrolyte cells. Accordingly, depending on the cell type either an inventive separator having a porous substrate or an inventive separator having a solid-state electrolyte substrate may be employed.

The oxidant used on the cathode side is sulfur or atmospheric oxygen. A specific difficulty with such cells is that (oligo- and poly-)sulfides or air constituents can diffuse to the anode and there undergo undesired side reactions which result in degradation of the electrode, for example oxidation of lithium to $Li_2S$ or lithium oxides or nitrides. The GC layer of the present invention shows good permeability for Li-ions and relatively poor permeability for oligo- and polysulfides and air constituents. The separator of the present invention can therefore prevent such side reactions and thus help protect the anode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A separator for a lithium secondary cell, comprising:
    a separator substrate selected from porous separators for liquid electrolyte cells and solid-state electrolyte separators having lithium-ion conductivity; and
    a layer of glassy carbon (GC) coating applied atop at least on one side of the separator substrate, wherein the glass carbon layer has a thickness of 1 µm or less.

2. The separator according to claim 1, wherein the separator substrate is a porous separator for liquid electrolyte cells selected from film separators and nonwoven fabric separators optionally having a coating comprising ceramic particles, ceramic separators and multilayer combinations thereof.

3. The separator according to claim 1, wherein the separator substrate is a solid-state electrolyte separator, wherein the solid-state electrolyte is selected from ceramic lithium-ion conductors, glassy lithium-ion conductors, polymer electrolytes and combinations thereof.

4. A positive electrode having an integrated separator layer for a lithium all-solid-state cell, comprising:
    a positive electrode layer comprising at least one cathode active material, at least one solid-state electrolyte having lithium-ion conductivity and optionally at least one electrically conductive additive and/or at least one binder;
    a separator layer applied atop the positive electrode layer and comprising at least one solid-state electrolyte having lithium-ion conductivity and optionally at least one binder; and
    a layer of glassy carbon coating applied atop the separator layer, wherein the glass carbon layer has a thickness of 1 µm or less.

5. A negative electrode having an integrated glassy carbon layer for a lithium all-solid-state cell, comprising:
    a negative electrode layer comprising at least one anode active material, at least one solid-state electrolyte having lithium-ion conductivity and optionally at least one electrically conductive additive and/or at least one binder;
    a layer of glassy carbon coating applied atop the negative electrode layer, wherein the glass carbon layer has a thickness of 1 µm or less; and
    optionally a separator layer applied atop the glassy carbon layer and comprising at least one solid-state electrolyte having lithium-ion conductivity and optionally at least one binder.

6. A lithium secondary cell, comprising a negative electrode, a positive electrode and therebetween a separator according to claim 1, wherein the glassy carbon layer of the separator faces the negative electrode.

7. A lithium secondary cell, comprising a negative electrode, a positive electrode and therebetween a separator according to claim 2, wherein the glassy carbon layer of the separator faces the negative electrode.

8. A lithium secondary cell, comprising a negative electrode, a positive electrode and therebetween a separator according to claim 3, wherein the glassy carbon layer of the separator faces the negative electrode.

9. The lithium secondary cell according to claim 6, selected from a lithium-ion cell comprising a liquid electrolyte, an all-solid-state lithium-ion cell, a lithium-sulfur cell and a lithium-air cell.

10. The lithium secondary cell according to claim 6, wherein the negative electrode contains metallic lithium or a lithium alloy as the active material.

11. The lithium secondary cell according to claim 9, wherein the negative electrode contains metallic lithium or a lithium alloy as the active material.

12. A lithium all-solid-state secondary cell comprising an electrode according to claim 4.

13. A lithium all-solid-state secondary cell comprising an electrode according to claim 5.

* * * * *